United States Patent
Nishida et al.

(10) Patent No.: US 10,774,247 B2
(45) Date of Patent: Sep. 15, 2020

(54) ONE-COMPONENT TYPE THERMOSETTING ADHESIVE COMPOSITION AND BODY STRUCTURE FOR VEHICLE APPLYING THE SAME

(71) Applicants: Sunstar Engineering Inc., Osaka (JP); Mazda Motor Corporation, Hiroshima (JP)

(72) Inventors: Takatomi Nishida, Osaka (JP); Shohei Yanagisawa, Osaka (JP); Katsuya Himuro, Hiroshima (JP); Kenichi Yamamoto, Hiroshima (JP); Motoyasu Asakawa, Hiroshima (JP); Tomoya Yoshida, Hiroshima (JP)

(73) Assignees: SUNSTAR ENGINEERING INC., Osaka (JP); MAZDA MOTOR CORPORATION, Hiroshima (JP)

( * ) Notice: Subject to any disclaimer, the term of this patent is extended or adjusted under 35 U.S.C. 154(b) by 29 days.

(21) Appl. No.: 16/109,917

(22) Filed: Aug. 23, 2018

(65) Prior Publication Data
US 2019/0062611 A1    Feb. 28, 2019

(30) Foreign Application Priority Data
Aug. 24, 2017 (JP) .................. 2017-161392

(51) Int. Cl.
 *C09J 163/00* (2006.01)
 *C09J 11/08* (2006.01)
(52) U.S. Cl.
 CPC ............. *C09J 163/00* (2013.01); *C09J 11/08* (2013.01)
(58) Field of Classification Search
 CPC ...... C09J 163/00; C09J 163/04; C09J 163/08; C09J 163/10
 See application file for complete search history.

(56) References Cited

U.S. PATENT DOCUMENTS

2005/0238299 A1* 10/2005 Takahashi ............ G02B 6/4432
                                                 385/100
2008/0139747 A1*  6/2008 Ramotowski ...... C08G 59/5046
                                                 525/194
(Continued)

FOREIGN PATENT DOCUMENTS

JP    H2-150484    6/1990
JP    2010-185034  8/2010
(Continued)

OTHER PUBLICATIONS

Fukutome, H. et al. "The study on application of high damping adhesive to body joining locations", Proceedings, Society of Automotive Engineers of Japan Inc., No. 945, pp. 81 to 84 (1994).

*Primary Examiner* — Scott R. Walshon
*Assistant Examiner* — Jasper Saberi
(74) *Attorney, Agent, or Firm* — Meunier Carlin & Curfman LLC

(57) ABSTRACT

The present invention provides a one-component type thermosetting adhesive composition used as an automotive structural adhesive having high damping performance without reducing adhesive strength and having excellent low-temperature curability and a body structure for vehicle, on which the one-component type thermosetting adhesive composition is applied. The present invention relates to a one-component type thermosetting adhesive composition comprising an epoxy resin and an amine-based latent curing agent,
 wherein the epoxy resin comprises:
  (1) a dibasic acid ester-based epoxy resin,
  (2) a butadiene-acrylonitrile copolymer modified epoxy resin, and
  (3) an unmodified bisphenol A type epoxy resin,
 and wherein a thermally cured product formed from the composition has:

(Continued)

a loss tangent tan δ at 23° C. of not less than 0.2 as a damping performance, and a Young's modulus of not less than 50 MPa, and a body structure for vehicle, on which the one-component type thermosetting adhesive composition is applied.

7 Claims, 2 Drawing Sheets

(56) References Cited

U.S. PATENT DOCUMENTS

| | | | |
|---|---|---|---|
| 2010/0092733 A1* | 4/2010 | Blank | C09J 163/00 428/174 |
| 2016/0244603 A1* | 8/2016 | Okamoto | C09J 11/08 |
| 2017/0321094 A1* | 11/2017 | Holtgrewe | C08G 59/184 |

FOREIGN PATENT DOCUMENTS

| | | |
|---|---|---|
| JP | 2013-253131 | 6/2012 |
| JP | 5375008 B2 * | 12/2013 |
| JP | 2017-52922 | 3/2017 |

* cited by examiner

ONE-COMPONENT TYPE THERMOSETTING ADHESIVE COMPOSITION AND BODY STRUCTURE FOR VEHICLE APPLYING THE SAME

FIELD OF THE INVENTION

The present invention relates to a one-component type thermosetting adhesive composition used, for example, as an automotive structural adhesive having high damping performance without reducing adhesive strength, and a body structure for vehicle jointed by the one-component type thermosetting adhesive composition.

BACKGROUND OF THE INVENTION

Vibration and noise of an automotive are generated from a drive system, such as an engine and a tire, and transmitted to a passenger compartment through each part of vehicle body. Recently, such a problem with respect to the vibration and noise has been solved by adding components such as a damping material and a soundproofing material to a transmission path of vibration and the like, but there have been defects that the weight and cost were increased. Thereby, high damping adhesives have been required as an adhesive used for the transmission path of vibration and the like, that is, a joining portion of the components (Non-patent Document).

A one-component type thermosetting adhesive of epoxy resin and the like are used as an automotive structural adhesive and are simultaneously cured during baking of electrodeposition coating in automobile manufacturing lines. Recently, it has been required to lower a baking temperature and shorten a baking time in terms of consideration for a global environment and reduction of a production cost. In addition, since application sites of the structural adhesive in the automobile have been increased, it has been difficult to secure a sufficient curability by using a conventional adhesive, and more low-temperature curable adhesives have been required.

Heretofore, many adhesive compositions, to which flexibility is imparted by using epoxy resins having a long chain structure or a rubber-based structure as a material for the adhesive, have been proposed (Patent Documents 1 to 4). However, there has been no one-component type thermosetting adhesive composition which has high elastic modulus required for the structural adhesive having high strength and high rigidity in order to efficiently transmit a force and a damping performance of vibration and the like; and is low-temperature curable such that the curing condition is limited.

PRIOR ART

Patent Documents

Patent Document 1: JP H2-150484 A
Patent Document 2: JP 2010-185034 A
Patent Document 3: JP 2013-253131 A
Patent Document 4: JP 2017-52922 A

Non-Patent Document

Hideki Fukutome, Kazuyuki Nakazato, Yoshihiro Aoi, "The study on application of high damping adhesive to body joining locations", Proceedings, Society of Automotive Engineers of Japan Inc., No. 945, pages 81 to 84 (1994)

OBJECTS OF THE INVENTION

An object of the present invention is to solve the above mentioned problems concerning conventional high damping low-temperature curable epoxy-based adhesive composition for an automobile, and to provide a one-component type thermosetting adhesive composition used as an automotive structural adhesive which is low-temperature curable and has high damping performance without reducing adhesive strength, and a body structure for vehicle jointed by the one-component type thermosetting adhesive composition.

The present inventors have intensely studied solutions for solving the above mentioned problems and have found that it is possible to provide:
 a one-component type thermosetting adhesive composition used as an automotive structural adhesive which is low-temperature curable and has high damping performance without reducing adhesive strength by using a combination of specified epoxy resins; and adjusting a loss tangent tan δ as a damping performance and a Young's modulus to specified ranges; in a one-component type thermosetting adhesive composition comprising an epoxy resin and an amine-based latent curing agent, and
a body structure for vehicle jointed by the one-component type thermosetting adhesive composition. The present invention has been completed based on the above finding.

SUMMARY OF THE INVENTION

The present invention relates to a one-component type thermosetting adhesive composition comprising an epoxy resin and an amine-based latent curing agent,
 wherein the epoxy resin comprises:
  (1) a dibasic acid ester-based epoxy resin,
  (2) a butadiene-acrylonitrile copolymer modified epoxy resin, and
  (3) an unmodified bisphenol A type epoxy resin,
 and wherein a thermally cured product formed from the composition has:
  a loss tangent tan δ at 23° C. of not less than 0.2 as a damping performance, and
  a Young's modulus of not less than 50 MPa.
In order to suitably carry out the present invention, it is desired that:
 a content of the dibasic acid ester-based epoxy resin is within the range of 5 to 40% by mass, based on the total mass of the composition;
 the thermally cured product is formed at a curing condition of 130° C. for 15 minutes;
 the dibasic acid ester-based epoxy resin is a dibasic acid ester-based epoxy resin containing no bisphenol structure;
 the dibasic acid ester-based epoxy resin comprises both of a dibasic acid ester-based epoxy resin containing no bisphenol structure and a dibasic acid ester-based epoxy resin containing a bisphenol structure.
 the dibasic acid ester-based epoxy resin containing no bisphenol structure is at least one selected from the group consisting of a dibasic acid ester-based epoxy resin containing an acrylic structure, a dibasic acid ester-based epoxy resin containing a butadiene structure, a dibasic acid ester-based epoxy resin containing an acrylonitrile structure, a dibasic acid ester-based epoxy resin containing a polyoxyalkylene structure and a dibasic acid ester-based epoxy resin containing an urethane structure; and the one-component type thermosetting adhesive composition further comprising acrylic rubber particles.

In addition, another embodiment of the present invention is:

a body structure for vehicle comprising a vehicle body constituent member forming a closed sectional part and a reinforcing member arranged in the closed sectional part and joined to the vehicle body constituent member, wherein the one-component type thermosetting adhesive composition is applied between the vehicle body constituent member and a flange part formed around the reinforcing member; and a body structure for vehicle comprising two or more vehicle body constituent members mutually jointed, the vehicle body constituent members forming a closed sectional part and comprising a joining flange part at an end portion thereof, wherein the one-component type thermosetting adhesive composition is applied between the mutual joining flange parts.

Effects of the Invention

In the present invention, it is possible to provide a one-component type thermosetting adhesive composition used as an automotive structural adhesive which is low-temperature curable and has high damping performance without reducing adhesive strength by using a combination of specified epoxy resins, that is, a combination of a dibasic acid ester-based epoxy resin, a butadiene-acrylonitrile copolymer modified epoxy resin, and an unmodified bisphenol A type epoxy resin; and by adjusting a loss tangent tan δ as a damping performance and a Young's modulus of a thermally cured product formed from the composition to specified ranges; in a one-component type thermosetting adhesive composition comprising an epoxy resin and an amine-based latent curing agent; and a body structure for vehicle jointed by the one-component type thermosetting adhesive composition.

DETAILED DESCRIPTION OF THE INVENTION

Figure 1:
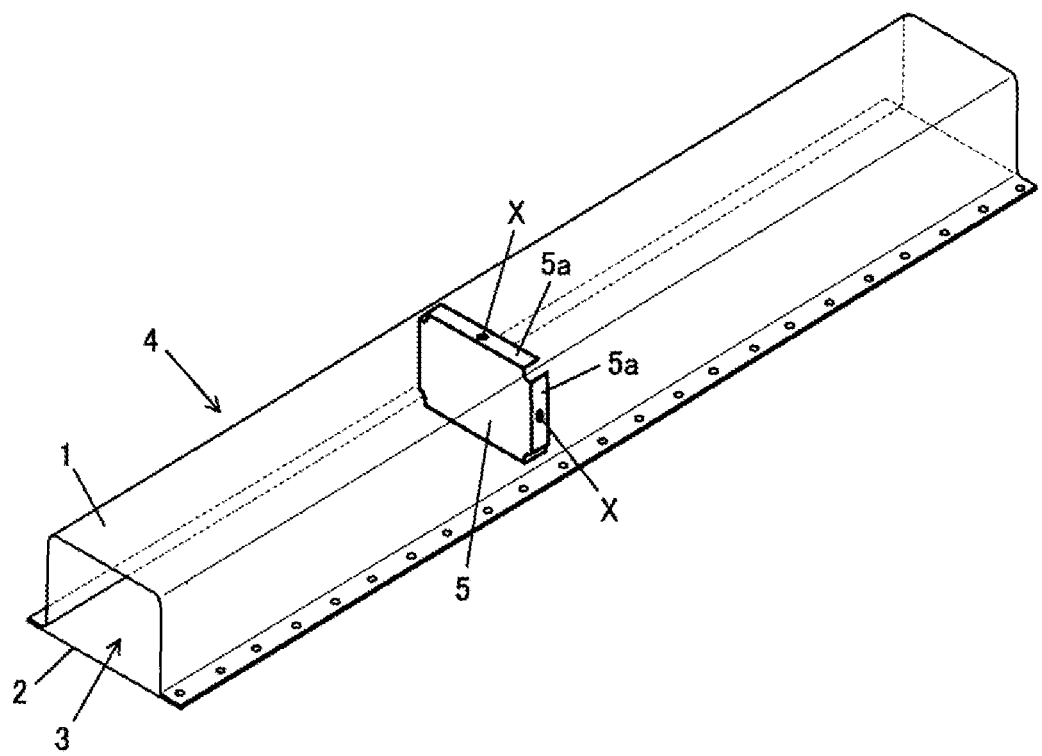
FIG. 1 is a schematic perspective view illustrating a body structure for vehicle of prior art.

The one-component type thermosetting adhesive composition of the present invention comprises an epoxy resin and an amine-based latent curing agent, the epoxy resin comprises:

(1) a dibasic acid ester-based epoxy resin,
(2) a butadiene-acrylonitrile copolymer modified epoxy resin, and
(3) an unmodified bisphenol A type epoxy resin.

The dibasic acid ester-based epoxy resin is an epoxy resin modified with a dimer acid as a long chain dibasic acid, and it is typically used for imparting a flexibility to a cured product of an adhesive composition and the like. Examples of the dibasic acid ester-based epoxy resins (1) used in the one-component type thermosetting adhesive composition of the present invention include dimer acid diglycidyl esters obtained by epoxidizing a dimer acid; dimer acid glycidyl ester modified products obtained by modifying bisphenol type epoxy resins such as diglycidyl ethers of bisphenol A, bisphenol F, bisphenol S, bisphenol AD with a dimer acid; and the like.

As the dibasic acid ester-based epoxy resins (1) used in the one-component type thermosetting adhesive composition of the present invention, the dibasic acid ester-based epoxy resins having an epoxy equivalent weight of 250 to 2000 g/eq., preferably 300 to 800 g/eq. may be used. Examples of the dibasic acid ester-based epoxy resins commercially available include "jER™ 871" (dimer acid glycidyl ester), "jER™ 872" (dimer acid-modified bisphenol A type epoxy resin), which are commercially available from Mitsubishi Chemical Corporation and the like.

A content of the dibasic acid ester-based epoxy resin (1) in the epoxy resins used in the one-component type thermosetting adhesive composition of the present invention is within the range of 3 to 60% by mass, preferably 5 to 40% by mass. When the content of the dibasic acid ester-based epoxy resin is not less than 3% by mass, high loss tangent tan δ may be maintained. On the other hand, when the content of the dibasic acid ester-based epoxy resin is not more than 60% by mass, high adhesive strength may be maintained.

Examples of the butadiene-acrylonitrile copolymer modified epoxy resins (2) used in the one-component type thermosetting adhesive composition of the present invention include butadiene-acrylonitrile copolymer modified epoxy resins produced by formulating a carboxyl-terminated butadiene-acrylonitrile copolymer rubber and an epoxy resin at a weight ratio of 1:5 to 4:1, preferably 1:3 to 3:2 and reacting them at a temperature of 80 to 180° C. As the butadiene-acrylonitrile copolymer modified epoxy resins (2) used in the one-component type thermosetting adhesive composition of the present invention, butadiene-acrylonitrile copolymer modified epoxy resins having an epoxy equivalent weight of 250 to 1500 g/eq., preferably 300 to 500 g/eq. may be used.

Examples of the epoxy resins include, for example, bisphenol type epoxy resins such as diglycidyl ethers of bisphenol A, bisphenol F, brominated bisphenol A and bisphenol AD; and diglycidyl ethers of alkylene oxide adducts of bisphenol A, and specific examples thereof include "jER™ 828", "jER™ 807", which are commercially available from Mitsubishi Chemical Corporation and the like. As the other epoxy resins used in the butadiene-acrylonitrile copolymer modified epoxy resins (2), epoxy resins included in the dibasic acid ester-based epoxy resins (1), such as "jER™ 871" (dimer acid glycidyl ester), "jER™ 872" (dimer acid-modified bisphenol A type epoxy resin), which are commercially available from Mitsubishi Chemical Corporation and the like may be used.

Examples of the butadiene-acrylonitrile rubbers include, for example, CTBN (carboxyl-terminated butadiene-acrylonitrile rubber), and specific examples thereof include "Hycar™ CTBN 1300×13", "Hycar™ CTBN 1300×8", "Hycar™ CTBN 1300×31", which are commercially available from Lubrizol Corporation and the like. Since the CTBN has poor compatibility with the epoxy resin when the CTBN is used alone, it is necessary to use CTBN previously modified.

A content of the butadiene-acrylonitrile copolymer in epoxy resins comprising the modified epoxy resins used in the one-component type thermosetting adhesive composition of the present invention is within the range of 2 to 20% by mass, preferably 5 to 15% by mass. When the content of the butadiene-acrylonitrile copolymer is not less than 2% by mass, high loss tangent tan δ may be maintained. On the other hand, when the content of the butadiene-acrylonitrile copolymer is not more than 20% by mass, high adhesive strength may be maintained.

As the unmodified bisphenol A type epoxy resin (3) used in the one-component type thermosetting adhesive composition of the present invention, unmodified bisphenol A type epoxy resins having an epoxy equivalent weight of 150 to 500 g/eq., preferably 160 to 300 g/eq. may be used. Examples of the unmodified bisphenol A type epoxy resins commercially available include, for example, "jER™ 828" which is commercially available from Mitsubishi Chemical Corporation, and the like. A content of the unmodified bisphenol A type epoxy resin in epoxy resins used for the one-component type thermosetting adhesive composition of the present invention is within the range of 5 to 50% by mass, preferably 10 to 40% by mass. When the content of the unmodified bisphenol A type epoxy resin is not less than 5% by mass, high Young's modulus and high adhesive strength may be maintained. On the other hand, when the content of the unmodified bisphenol A type epoxy resin is not more than 50% by mass, high loss tangent tan 67 may be maintained.

As the amine-based latent curing agent used in the one-component type thermosetting adhesive composition of the present invention, amine-based latent curing agents which is activated within a temperature range of 70 to 180° C. may be used. Examples thereof include, for example, dicyandiamide, 4, 4'-diaminodiphenylsulfone, imidazoles or derivatives thereof (such as 2-n-heptadecylimidazole), isophthalic dihydrazide, N, N'-dialkyl urea derivatives, N, N-dialkyl thiourea derivatives, melamine derivatives and the like. Various adducts (such as amine adducts, polyamide resins) maintaining the activity of amines such as aliphatic, alicyclic and aromatic amines may be also used. The amine-based latent curing agent may be used alone or in combination of two or more.

An amount of the amine-based latent curing agent used in the one-component type thermosetting adhesive composition of the present invention is within the range of 2 to 20 parts by mass, preferably 3 to 10 parts by mass, based on 100 parts by mass of the epoxy resins (1) to (3). When the amount of the amine-based latent curing agent is not less than 2 parts by mass, it is possible to have excellent low-temperature curability. On the other hand, when the amount of the amine-based latent curing agent is not more than 20 parts by mass, it is possible to achieve excellent adhesive strength.

The one-component type thermosetting adhesive composition of the present invention may further comprise acrylic rubber particles. The acrylic rubber particles are preferably core-shell type acrylic rubber particles comprising butadiene or butyl acrylate as a core part. The core part of the acrylic rubber particles preferably has a glass transition temperature Tg of not more than −40° C. An acrylic-modified epoxy resin obtained by previously reacting epoxy resin with a carboxyl group of the shell part may be used. Specific examples of the acrylic rubber particles include "Kane Ace™ MX-257" which is commercially available from Kaneka Corporation, "Acryset™ BPF307" which is commercially available from Nippon Shokubai Co., Ltd., "Zefiac™ F351" which is commercially available from Aika Kogyo Co., Ltd. and the like.

The one-component type thermosetting adhesive composition of the present invention may optionally contain curing accelerators; other diluents; fillers such as calcium oxide, calcium carbonate, wollastonite, carbon black, silica, cray, talc, titanium oxide, quicklime, kaolin, zeolite, diatomaceous earth; plasticizers such as diisononylphthalate, dioctylphthalate, dibutylphthalate, dilaurylphthalate, butylbenzylphthalate, dioctyl adipate, diisodecyl adipate, trioctyl phosphate, tris(chloroethyl) phosphate, tris(dichloropropyl) phosphate, adipic acid-propylene glycol polyester, adipic acid-butylene glycol polyester, alkyl epoxy stearate, alkyl benzene, epoxidized soybean oil; anti-aging agents; antioxidants; ultraviolet absorbers; coloring agents; and the like, which are used for an usual epoxy resin. Particularly, it is preferable to contain fillers in the one-component type thermosetting adhesive composition of the present invention in order to improve the Young's modulus of the thermally cured product thereof.

Curing condition of the one-component type thermosetting adhesive composition of the present invention, which may vary depending on a type of adherend and manufacturing process capability, is usually at 120 to 200° C. for 10 to 60 minutes.

It is required for the thermally cured product of the one-component type thermosetting adhesive composition of the present invention to have a loss tangent tan δ at 23° C. measured by dynamic viscoelasticity measurement of not less than 0.2, preferably not less than 0.3, more preferably not less than 0.4. When the tan δ is not less than 0.2, the adhesive may have an excellent damping performance in an operating temperature range thereof.

It is required for the thermally cured product of the one-component type thermosetting adhesive composition of the present invention to have a Young's modulus of not less than 50 MPa, preferably not less than 80 MPa, more preferably not less than 100 MPa in addition to the tan δ. When the Young's modulus is not less than 50 MPa, the rigidity and adhesive strength required for the structural adhesives may be maintained.

As a factor for estimating a damping performance of adhesives, a loss tangent tan δ measured by dynamic viscoelasticity measurement of thermally cured products of thermosetting adhesive compositions has been used. It is shown that the adhesives have a high damping effect in a broad temperature range and thus have an excellent damping performance, when the value of the tan δ is higher and the range thereof is broader. In polymeric materials such as epoxy resin, since the tan δ usually shows a peak value around a glass transition temperature (Tg) thereof, the tan δ is high if materials having a Tg in the operating temperature range are used. However, an elastic modulus in the operating temperature range is very low, and it does not function as a structural adhesive used for maintaining the rigidity.

A method of increasing the value of the tan δ by mixing conventional adhesives usually having a Tg higher than the operating temperature range with a component having a Tg lower than that of the conventional adhesives in consideration with a balance between an elastic modulus in the operating temperature range and the tan δ has been thus considered. Epoxy resins and curing agents for reducing a crosslinking density of the thermally cured product, of which the molecular weight between reactive groups is high; epoxy resins and curing agents containing structures for lowering Tg, such as a long-chain structure, a rubber-based structure; and the like have been conventionally used as the components having a lower Tg. However, there are two peaks of tan δ when the two materials mixed are incompatible, and the value of tan δ is low between the both Tg's. On the other hand, the peaks are overlapped when the two materials mixed are compatible, but a temperature range, in which the value of tan δ is high, is narrow. Therefore, it is impossible to obtain a one-component type thermosetting adhesive composition used as an automotive structural adhesive having an excellent damping performance only by mixing a plurality of materials such that the Tg of the thermally cured product of the adhesive is around an operating temperature range of the adhesive.

The present inventors would achieve a one-component type thermosetting adhesive composition used as an automotive structural adhesive which is low-temperature curable and has high damping performance as a high loss tangent tan δ in an operating temperature range of the adhesive without reducing adhesive strength by a combination of:

an epoxy resin comprising
  (1) a dibasic acid ester-based epoxy resin,
  (2) a butadiene-acrylonitrile copolymer modified epoxy resin, and
  (3) an unmodified bisphenol A type epoxy resin;
and an amine-based latent curing agent
due to researching and examining a type of the materials mixed, a mixing ratio of the materials, Tg of the materials, a compatibility of the materials and the like. The effects would be achieved by forming a broad peak of tan δ in an operating temperature range of the adhesive as described above particularly due to a combination of the materials (2) and (3) which are incompatible and the material (1) which functions as a compatibilizer thereof. It is possible to adjust the compatibilizing effect by using compounds having structures of the materials (1) and (3), or compounds having structures of the materials (1) and (2).

As another embodiment of the present invention, there is a body structure for vehicle comprising a vehicle body constituent member forming a closed sectional part and a reinforcing member arranged in the closed sectional part and joined to the vehicle body constituent member, wherein the adhesive composition of the present invention is applied between the vehicle body constituent member and a flange part formed around the reinforcing member. The body structure for vehicle is shown, for example, in FIG. 2.

Figure 2:
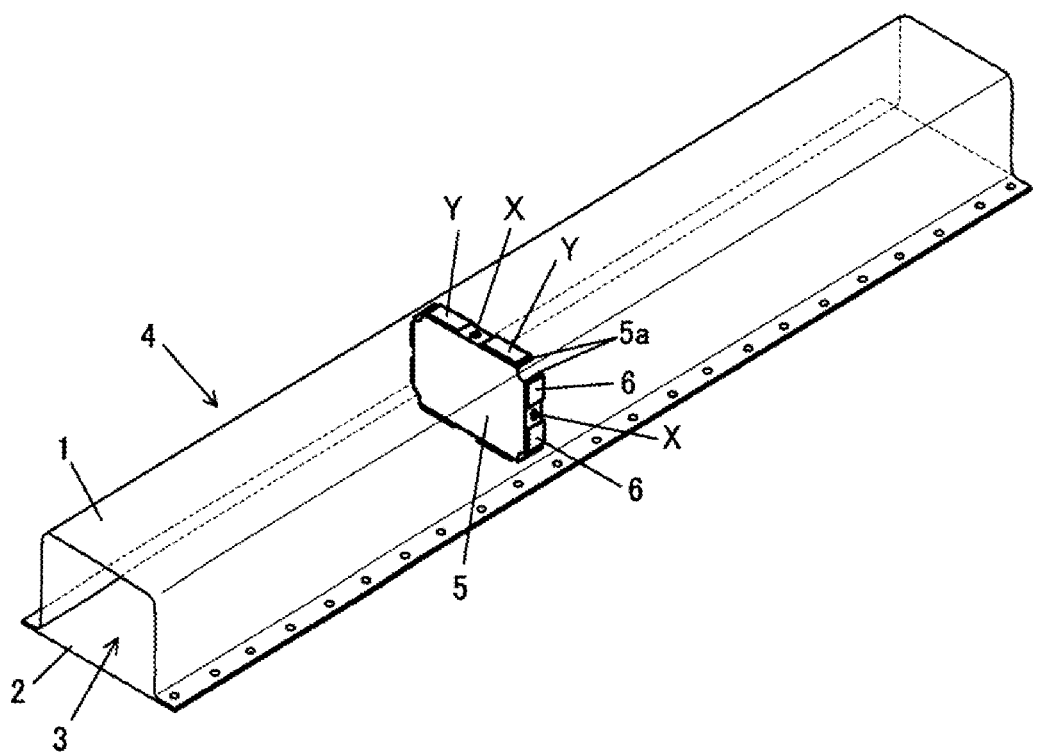
FIG. 2 is a schematic perspective view illustrating one embodiment of the body structure for vehicle of the present invention.

FIG. 1 is a schematic perspective view illustrating a body structure for vehicle of prior art. FIG. 2 is a schematic perspective view illustrating one embodiment of the body structure for vehicle of the present invention. In the both of FIG. 1 and FIG. 2, a hollow frame 4 having a closed sectional part 3, of which a cross-section is substantially a rectangular shape is shown, the hollow frame is formed by using a first member 1, of which a cross-section is a hat-shape and a second member 2 of a planar shape as a vehicle body constituent member and by jointing both side flanges of the first member 1 to both side end portions of the second member 2. A bulkhead 5 is arranged in the closed sectional part 3 of the frame 4 as a reinforcing member, and the bulkhead 5 is fixed in the frame 4 by jointing the flanges 5a . . . 5a arranged at four sides around the bulkhead 5 to an inner surface of the first member 1 and the second member 2.

In FIG. 1, a hollow frame 4 of a conventional type, in which the flanges 5a . . . 5a of the bulkhead 5 are jointed in a central part to an inner surface of the first member 1 and the second member 2 only by a spot welding is shown. In FIG. 2, the body structure for vehicle of the present invention, in which the flanges 5a . . . 5a are jointed in a central part by a spot welding and on the both sides through a high damping adhesive to an inner surface of the first member 1 and the second member 2 is shown. As described above, the high damping adhesive satisfies:

a loss tangent tan δ at 23° C. of not less than 0.2 as a damping performance, and
a Young's modulus of not less than 50 MPa.

As yet another embodiment, there is a body structure for vehicle comprising two or more vehicle body constituent members mutually jointed, the vehicle body constituent members forming a closed sectional part and comprising a joining flange part at an end portion thereof, wherein the adhesive composition of the present invention is applied between the mutual joining flange parts.

A vibration damping performance is excellent without increasing a weight and cost because it is not necessary to add separate components such as a damping material, a soundproof material; and it is possible to decrease a baking temperature and a baking time because of a low-temperature curability, and thus it is possible to contribute to consideration of global environments and reduction in manufacturing costs;

by using the one-component type thermosetting adhesive composition of the present invention used as an automotive structural adhesive which is low-temperature curable and has high damping performance for a body structure for vehicle.

EXAMPLES

The following Examples and Comparative Examples more specifically illustrate the present invention, but are not to be construed to limit the present invention thereby.

Examples 1 to 7 and Comparative Examples 1 to 2

The curable composition formulations shown in Table 1 and Table 2 were mixed with a kneader, were mixed with a triple roll mill two times, and were then agitated and degassed with the kneader to prepare one-component type thermosetting adhesive compositions.

TABLE 1

(parts by mass)

| Curable composition | Example 1 | 2 | 3 | 4 | 5 | 6 | 7 |
|---|---|---|---|---|---|---|---|
| Bisphenol A type epoxy resin *1 | — | 10 | 2.5 | — | — | — | — |
| Acrylic-modified epoxy resin *2 | 10 | — | 10 | 10 | 10 | 10 | — |
| CTBN-modified epoxy resin *3 | 10 | 10 | 10 | 10 | 5 | 10 | 15 |
| Dimer acid-modified epoxy resin *4 | 20 | 20 | 22.5 | 15 | 15 | — | 30 |
| Dimer acid-modified epoxy resin *5 | 5 | 5 | — | — | 5 | 5 | — |
| Dimer acid/CTBN-modified epoxy resin *6 | — | — | — | 10 | 10 | 20 | — |
| Hexanediol DGE *7 | — | — | — | — | — | — | — |
| Dicyandiamide | 6 | 6 | 6 | 6 | 6 | 6 | 6 |
| Diurea *8 | 6 | 6 | 6 | 6 | 6 | 6 | 6 |
| Imidazole *9 | 0.5 | 0.5 | 0.5 | 0.5 | 0.5 | 0.5 | 0.5 |
| Calcium oxide | 2 | 2 | 2 | 2 | 2 | 2 | 2 |
| Wollastonite *10 | 20 | 20 | 20 | 20 | 20 | 20 | 20 |
| Calcium carbonate | 10 | 10 | 10 | 10 | 10 | 10 | 10 |
| Carbon black | 5 | 5 | 5 | 5 | 5 | 5 | 5 |

TABLE 2

| Curable composition | (parts by mass) Comparative Example | |
|---|---|---|
| | 1 | 2 |
| Bisphenol A type epoxy resin *1 | 10 | — |
| Acrylic-modified epoxy resin *2 | 10 | 20 |
| CTBN-modified epoxy resin *3 | 10 | — |
| Dimer acid-modified epoxy resin *4 | — | 20 |
| Dimer acid-modified epoxy resin *5 | — | 5 |
| Dimer acid/CTBN-modified epoxy resin *6 | — | — |
| Hexanediol DGE *7 | 15 | — |
| Dicyandiamide | 6 | 6 |
| Diurea *8 | 6 | 6 |
| Imidazole *9 | 0.5 | 0.5 |
| Calcium oxide | 2 | 2 |
| Wollastonite *10 | 20 | 20 |
| Calcium carbonate | 10 | 10 |
| Carbon black | 5 | 5 |

(*1): Bisphenol A type epoxy resin, which is commercially available from Mitsubishi Chemical Corporation under the trade name "jER™ 828"

(*2) Liquid masterbatch formed by dispersing core-shell type rubber particles (concentration: 37%) as a single particle in liquid bisphenol A type epoxy resin, which is commercially available from Kaneka Corporation under the trade name "Kane Ace™ MX-257"

(*3): Butadiene-acrylonitrile copolymer modified epoxy resin prepared by reacting carboxyl-terminated butadiene-acrylonitrile copolymer rubber ("Hycar™ CTBN 1300×8", which is commercially available from Lubrizol Corporation; 50% by mass) with bisphenol A type epoxy resin, which is commercially available from Mitsubishi Chemical Corporation under the trade name "jER™ 828" at a temperature of 130° C.

(*4) Dimer acid glycidyl ester, which is commercially available from Mitsubishi Chemical Corporation under the trade name "jER™ 871"

(*5) Dimer acid-modified bisphenol A type epoxy resin, which is commercially available from Mitsubishi Chemical Corporation under the trade name "jER™ 872"

(*6) Butadiene-acrylonitrile copolymer modified dimer acid ester-based epoxy resin prepared by reacting carboxyl-terminated butadiene-acrylonitrile copolymer rubber ("Hycar™ CTBN 1300×13", which is commercially available from Lubrizol Corporation; 15% by mass) with dimer acid glycidyl ester, which is commercially available from Mitsubishi Chemical Corporation under the trade name "jER™ 871" at a temperature of 130° C.

(*7) 1,6-hexanediol diglycidyl ether (*8) N, N-dimethyl-N'-(3, 4-dichlorophenyl)urea, which is commercially available from AlzChem AG under the trade name "Dyhard® UR200"

(*9) 2-heptadecylimidazole (mp.: 88° C.)

(*10) Wollastonite, which is commercially available from NYCO Minerals, Inc. under the trade name "NYAD® 325"

Evaluation of Physical Properties

With respect to the resulting one-component type thermosetting adhesive compositions, tan δ, Young's modulus and shear adhesive strength were measured.

The results are shown in Table 3 and Table 4. The test methods are as follows.

(Test Method)

(1) Tan δ

The resulting one-component type thermosetting adhesive composition was thermally cured at 130° C. for 15 minutes, and the thermally cured product was used as a sample (2 mm×40 mm×1 mm thickness). A storage elastic modulus E' and a loss tangent (tan δ) were measured at a frequency of 20 Hz while elevating a measurement temperature from −30° C. to 80° C. using a dynamic viscoelasticity measuring device (DMA), and the loss tangent at 23° C. was evaluated by the following evaluation criteria.

Evaluation Criteria oo: The loss tangent at 23° C. is not less than 0.4.

o⁺: The loss tangent at 23° C. is not less than 0.35 and less than 0.4.

o: The loss tangent at 23° C. is not less than 0.2 and less than 0.35.

x: The loss tangent at 23° C. is less than 0.2.

(2) Young's Modulus

After the resulting one-component type thermosetting adhesive composition was thermally cured at 130° C. for 15 minutes, the thermally cured product was molded to a dumbbell-shaped No. 1 test specimen in accordance with JIS K 7161 (a thickness of 2 mm, a width of 10 mm). A tensile strength was measured at a room temperature of 23° C., a gauge length of 50 mm and a tensile rate of 1 mm/min using an Instron type tensile tester, and a Young's modulus was determined from an inclination of the resulting stress-strain curve. The Young's modulus was evaluated by the following evaluation criteria.

Evaluation Criteria oo: The Young's modulus is not less than 100 MPa.

o⁺: The Young's modulus is not less than 80 MPa and less than 100 MPa.

o: The Young's modulus is not less than 50 MPa and less than 80 MPa.

x: The Young's modulus is less than 50 MPa.

(3) Shear Adhesive Strength (a) Low-Temperature Cured Shear Adhesive Strength

Two adherends of cold rolled steel plate SPCC-SD (100 mm×25 mm×1.6 mm) were bonded together with the resulting one-component type thermosetting adhesive composition such that an adhesive area is 12.5 mm×25 mm (a thickness of 2 mm), and were thermally cured at 130° C. for 15 minutes to obtain a test specimen. Shear adhesive strength at a room temperature of 23° C. of the test specimen was measured at a tensile rate of 50 mm/min using a tensile tester. The shear adhesive strength was evaluated by the following evaluation criteria.

Evaluation Criteria o: The shear adhesive strength is not less than 8 MPa.

Δ: The shear adhesive strength is not less than 4 MPa and less than 8 MPa.

x: The shear adhesive strength is less than 4 MPa.

(b) Low-Temperature Shear Adhesive Strength

A shear adhesive strength was measured as described in the (a) Low-temperature cured shear adhesive strength except that a measurement temperature was −30° C. The shear adhesive strength was evaluated by the following evaluation criteria.

Evaluation Criteria o: The shear adhesive strength is not less than 8 MPa.

Δ: The shear adhesive strength is not less than 4 MPa and less than 8 MPa.

x: The shear adhesive strength is less than 4 MPa.

TABLE 3

| Evaluation results | Example 1 | 2 | 3 | 4 | 5 | 6 | 7 |
|---|---|---|---|---|---|---|---|
| tan δ | ◎◎ | ◎ | ◎+ | ◎◎ | ◎◎ | ◎◎ | ◎◎ |
| Young's modulus (MPa) | ◎◎ | ◎◎ | ◎◎ | ◎+ | ◎◎ | ◎◎ | ◎ |
| Shear adhesive strength (MPa) | | | | | | | |
| 130° C. × 15 min-curing | ○ | ○ | ○ | ○ | ○ | ○ | ○ |
| Low-temperature (−30° C.) | ○ | △ | ○ | ○ | ○ | ○ | ○ |

TABLE 4

| Evaluation results | Comparative Example 1 | 2 |
|---|---|---|
| tan δ | x | x |
| Young's modulus (MPa) | ○○ | ○+ |
| Shear adhesive strength (MPa) | | |
| 130° C. × 15 min-curing | ○ | ○ |
| Low-temperature (−30° C.) | ○ | ○ |

As is apparent from the results shown in Table 3 and Table 4, the one-component type thermosetting adhesive compositions of Examples 1 to 7 of the present invention have excellent damping performance because of high tan δ, have excellent rigidity as an automotive structural adhesive because of high Young's modulus, and have excellent low-temperature curability and excellent adhesive strength because of high shear adhesive strength under curing at 130° C. for 15 minutes.

On the other hand, in the one-component type thermosetting adhesive composition of Comparative Example 1 which the dibasic acid ester-based epoxy resin (1) was not contained as the epoxy resin, the damping performance was very poor because of low tan δ. In addition, in the one-component type thermosetting adhesive composition of Comparative Example 2 which the butadiene-acrylonitrile copolymer modified epoxy resin (2) was not contained as the epoxy resin, the damping performance was very poor because of low tan δ.

DESCRIPTION OF REFERENCE NUMERALS

1: First member
2: Second member
3: Closed sectional part
4: Hollow frame
5: Bulkhead
5a: Flange
6: Adhesive
X: Spot welding part
Y: Adhesive joining part

What is claimed is:

1. A one-component type thermosetting adhesive composition comprising an epoxy resin and 2 to 20 parts by mass of an amine-based latent curing agent, based on 100 parts by mass of the epoxy resin, wherein the epoxy resin comprises: (1) a dibasic acid ester-based epoxy resin, (2) a butadiene-acrylonitrile copolymer modified epoxy resin, and (3) an unmodified bisphenol A type epoxy resin, wherein the content of the dibasic acid ester-based epoxy resin is within the range of 5 to 40% by mass of the composition, wherein the content of the butadiene-acrylonitrile copolymer of the butadiene-acrylonitrile copolymer modified epoxy resin is within the range of 2 to 20% by mass of all epoxy resins, wherein the content of the unmodified bisphenol A type epoxy resin is within the range of 10 to 40% by mass of all epoxy resins, wherein the butadiene-acrylonitrile copolymer modified epoxy resin is carboxyl-terminated, and wherein a thermally cured product formed from the composition at a curing condition of 130° C. for 15 minutes has: a loss tangent tan δ at 23° C. of not less than 0.3 as a damping performance, and a Young's modulus of not less than 80 MPa.

2. The one-component type thermosetting adhesive composition according to claim 1, wherein the dibasic acid ester-based epoxy resin is a dibasic acid ester-based epoxy resin containing no bisphenol structure.

3. The one-component type thermosetting adhesive composition according to claim 1, wherein the dibasic acid ester-based epoxy resin comprises both a dibasic acid ester-based epoxy resin containing no bisphenol structure and a dibasic acid ester-based epoxy resin containing a bisphenol structure.

4. The one-component type thermosetting adhesive composition according to claim 2, wherein the dibasic acid ester-based epoxy resin containing no bisphenol structure is at least one selected from the group consisting of a dibasic acid ester-based epoxy resin containing an acrylic structure, a dibasic acid ester-based epoxy resin containing a butadiene structure, a dibasic acid ester-based epoxy resin containing an acrylonitrile structure, a dibasic acid ester-based epoxy resin containing a polyoxyalkylene structure and a dibasic acid ester-based epoxy resin containing an urethane structure.

5. The one-component type thermosetting adhesive composition according to claim 1 further comprising acrylic rubber particles.

6. A body structure for a vehicle comprising a vehicle body constituent member forming a closed sectional part and a reinforcing member arranged in the closed sectional part and joined to the vehicle body constituent member, wherein the one-component type thermosetting adhesive composition according to claim 1 is applied between the vehicle body constituent member and a flange part formed around the reinforcing member.

7. A body structure for a vehicle comprising two or more vehicle body constituent members mutually jointed, the vehicle body constituent members forming a closed sectional part with each vehicle body constituent member comprising a joining flange part at an end portion thereof, wherein the one-component type thermosetting adhesive composition according to claim 1 is applied between mutual joining flange parts.

* * * * *